June 29, 1965 E. RAINER ETAL 3,192,409
ELECTRONIC DIRECT-CURRENT SWITCH
Filed Jan. 8, 1963
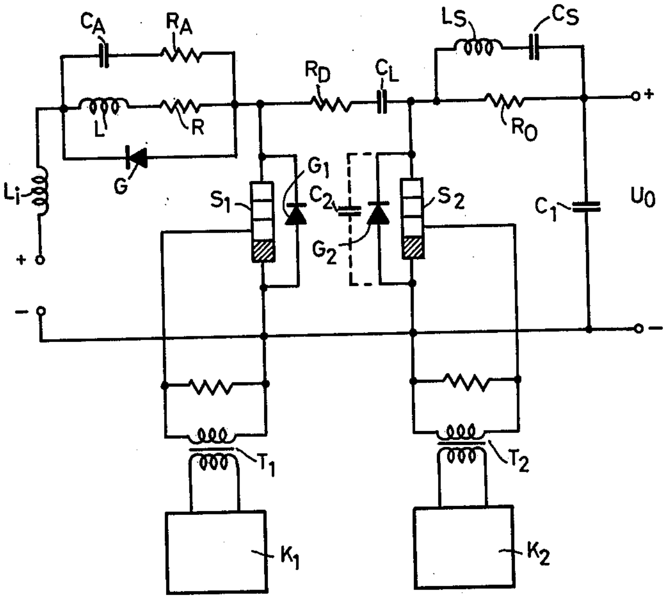

United States Patent Office 3,192,409

Patented June 29, 1965

3,192,409

ELECTRONIC DIRECT-CURRENT SWITCH

Erich Rainer, Nurnberg, and Erich Krestel, Erlangen, Germany, assignors to Siemens-Schuckertwerke Aktiengesellschaft, Berlin-Siemensstadt, Germany, a corporation of Germany Filed Jan. 8, 1963, Ser. No. 250,034
Claims priority, application Germany, Jan. 9, 1962, S 77,471
13 Claims. (Cl. 307—88.5)

Our invention relates to an electronic direct-current switch and particularly to a D.-C. semiconductor-controlled-rectifier switch having a turn-off circuit.

So-called semiconductor controlled rectifiers hereinafter referred to as SCR's exhibit an operative behaviour which is equivalent to that of gas-filled discharge tubes of the thyratron type. They usually comprise four-layer (p-n-p-n) semiconductors of silicon, which are fired by a pulse at the control electrode and which then conduct current until the applied voltage reverses its polarity or decreases below the value required for sustaining the current. For decreasing the applied direct voltage, various turn-off or extinction circuits have been used, most of them operating by capacitor discharge.

An object of our invention is to provide a simplified SCR switching circuit, which lessens the possibility of trouble, but which nevertheless affords reliable ignition and turn-off. Specifically it is an object of the invention to provide an SCR having a turn-off system wherein no additional circuit elements whatsoever are required in the circuit of the main SCR.

According to a feature of the present invention we connect parallel to a main SCR a series-circuit comprising an auxiliary SCR, a turn-off capacitor and a damping resistor, and we connect into the supply line for the auxiliary SCR a series-resonant circuit in parallel with a charging resistance.

Further objects, advantages and details of the present invention, as well as suitable ranges for the component used will be described hereinafter with respect to an embodiment of the present invention, reference being had to the accompanying drawing which is a schematic illustration thereof.

In the drawing, an inductive load simulated by the series-connection of a resistance R and an inductance L is connected to a direct voltage U via the main circuit of a main SCR $S_1$. A series-connection composed of a separately energized auxiliary SCR $S_2$, a turn-off capacitor $C_L$, and a damping resistor $R_D$ is connected parallel to the main circuit of semiconductor controlled rectifier $S_1$.

An inductance $L_S$ and a series capacitance $C_S$ form a series-resonant circuit across a charging resistance $R_0$ through which the auxiliary SCR is energized by a supply voltage $U_0$.

A pair of reversely biased diodes $G_1$ and $G_2$ connect respectively across the main circuit of the controlled rectifiers $S_1$ and $S_2$. Connected in parallel to the auxiliary SCR $S_2$ is a capacitor $C_2$ (although the invention also contemplates dispensing with this capacitor). A capacitor $C_1$ across the supply voltage $U_0$ is also provided.

Two flip-flop stages $K_1$ and $K_2$ connect respectively via pulse transformers $T_1$ and $T_2$ to the control circuits of SCR's $S_1$ and $S_2$ for firing of the controlled rectifiers. Flip-flop circuits are well known and are disclosed for example in the book "Electronic and Radio Engineering," by F. E. Terman published by the McGraw Hill Book Company, Inc., New York, Toronto and London, in 1955. A valve G connects parallel to the load L, R, to absorb transient voltage surges due to its inductance. In order to ensure maintenance of the conducting state of the SCR $S_1$ immediately after the firing, even with highly inductive loads, a capacitor $C_A$ in series with a resistance $R_A$ is connected in parallel to the load. The invention contemplates dispensing with the numbers $C_A$ and $R_A$, if the firing flip-flops are such that the firing pulse is continuously applied to the main SCR $S_1$, until the minimum holding or maintaining current is exceeded.

Turn-off of a semiconductor controlled rectifier, i.e., changing a semiconductor controlled rectifier over from the conducting into the non-conducting stage, requires keeping the anode-cathode voltage lower than the holding or maintaining voltage which is sufficient to maintain the current flow for a period of time $\tau$ which is at least equal to the turn-off time $T_L$. This holding voltage is in the order of one volt so that it may be simply postulated that the voltage at the controlled rectifier must become equal to or less than zero.

In view of the above the value of $C_L$ may be calculated from the equation $$C_L = e \cdot T_L \cdot \frac{I}{U_0}$$

wherein $e$ is the base of natural logarithms, $T_L$ is the turn-off time which amounts to approximately 10 microseconds, I is the selected load current and $U_0$ is the supply voltage of the auxiliary SCR $S_2$. Since $R_D \cdot C_L = T_L$, the value of $R_D$ is determined by the equation $$R_D = \frac{1}{e} \cdot \frac{U_0}{1}$$

Preferably the supply voltage $U_0$ is equal to the main voltage U. In this event, $R_D$ is equal to $1/e$ times the ohmic load resistance R.

Once SCR $S_1$ has been fired or turned on (i.e. rendered conductive) by the action of flip-flop $K_1$ its turn-off is achieved as follows:

The auxiliary SCR $S_2$ is fired by the flip-flop $K_2$ so that the voltage of the turn-off capacitor $C_L$ is connected in parallel to the main SCR $S_1$. The voltage across the main SCR $S_1$ is thereby reduced below the holding value, and the rectifier $S_1$ is turned off. The turn-off operation may be facilitated by means of a diode $G_1$ which shunts the discharge current of the turn-off capacitor $C_L$ so that merely the threshold voltage or forward-conducting voltage of the diode is applied across the main SCR $S_1$ in the blocking direction. With the capacitor $C_2$ and the damping resistor $R_D$ rated as mentioned above, the voltage across the main SCR will decrease and remain below the holding value sufficiently long to extinguish the SCR $S_1$.

The now-conducting auxiliary SCR $S_2$ must also be turned off (extinguished) in order to return the switch into its stand-by condition. This is achieved by means of the series-resonant circuit $L_S$, $C_S$ which is excited to oscillate when the auxiliary SCR $S_2$ is fired.

With respect to the value of the components in the resonant circuit $L_S$, $C_S$ and of the charging resistance $R_0$ the following may be considered:

$T_0$ represents the time after which the discharge of the capacitor $C_L$ occurring in connetcion with the turn-off of the main SCR, will terminate. It is composed of three terms, namely $$T_0 = T_L + \frac{(R + R_D) \cdot C_L}{2} + \frac{2L_i}{R_D}$$

wherein R is the ohmic resistance of the load, and $L_i$ is the internal inductance of the voltage U. The oscillation current of the series-resonant circuit, which commences upon firing of the auxiliary SCR $S_2$, is superimposed upon the constant basic current $$I_0 = \frac{U_0}{R_0}$$

and upon the discharge current of the turn-off (i.e. extinction) capacitor $C_L$. If the current of the second half cycle, which is opposed to the forward direction of the auxiliary SCR $S_2$, exceeds the two currents flowing in the forward direction, then a current will pass via diode $G_2$, the voltage falls below the holding voltage of the controller rectifier $S_2$, and the controlled rectifier is turned off. As the discharge current of the capacitor $C_L$ is high, the oscillation period of the series-resonant circuit is selected to be so long that the peak of the opposed half wave will not be reached before a time corresponding to at least two time-constants $T_0$ has elapsed. Thus the rating is determined by $$L_S \cdot C_S = \left(\frac{2}{3\pi}\right) 2 \cdot (2T_0)^2$$

and $$R_0^2 = \frac{L_S}{C_S}$$

Consequently, the charging resistance must be chosen to be equal to the oscillatory resistance $$\sqrt{\frac{L_S}{C_S}}$$

of the series-resonant circuit.

The auxiliary SCR $S_2$ will be turned off after the main SCR has been turned off if the circuit elements are given these values.

The switch according to the present invention is suitable as an on-off control with pulse width modulation. For this purpose it is desirable that the circuit provide for as wide a control range as possible. The control range depends on the limits within which the ratio of pulse width and period duration of the turn-off pulses may be altered. In the ideal case, this ratio should continuously assume all the values between 1 and 0.

The value 1 for the ratio may be approximated, if suitable control means for the firing pulses are provided. In practice, approximations as close as 1% have been achieved. Values near zero are more difficult to approach, as the control range is limited by the expiration of the time which is required for the discharge of the capacitor $C_L$. Only after the capacitor $C_L$ has been completely discharged may the main SCR $S_1$ be turned off by firing of the auxiliary SCR $S_2$. Thus, the smallest obtainable pulse width is in the order of $$2 \cdot C_L \cdot (R_0 + R_D)$$

Consequently, the time constant of the RC member comprising the turn-off capacitor, the damping resistor, and the charging resistance, equals one half of the minimum pulse width.

The basic circuit according to the present invention such as diagrammatically illustrated in the drawing allows for a number of modifications without substantially altering its mode of operation as hereinabove described. More particularly, the two values $G_1$ and $G_2$ are not absolutely necessary. However, what is essential is the fact that the present invention allows for arbitrarily repeated connection and disconnection of D.C. loads, without having to provide additional energy-consuming circuit elements in the load circuit.

It will be obvious to those skilled in the art that the invention may be practiced otherwise without departing from the spirit and scope thereof.

We claim:

1. An electronic switch for operation between a voltage supply and a load, comprising a semiconductor controlled rectifier, firing means for turning on said rectifier, series circuit means including an auxiliary controlled rectifier means and a turn-off capacitor as well as a damping resistor, said series circuit means being connected across said semiconductor controlled rectifier for turning it off, and supply means for said rectifier means including a charging resistor and a series resonant circuit across said charging resistor.

2. An electronic switch for operation between a voltage supply and a load, comprising a semiconductor controlled rectifier, firing means for turning on said rectifier, series circuit means including an auxiliary controlled rectifier means and a turn-off capacitor as well as a damping resistor, said series circuit means being connected across said semiconductor controlled rectifier for turning it off, supply means for said rectifier means including a charging resistor and a series resonant circuit across said charging resistor, and a pair of diodes connected respectively across said rectifier and said rectifier means.

3. An electronic switch for operation between a voltage supply and a load, comprising a semiconductor controlled rectifier, firing means for turning on said rectifier, series circuit means including an auxiliary controlled rectifier means and a turn-off capacitor as well as a damping resistor, said series circuit means being connected across said semiconductor controlled rectifier for turning it off, supply means for said rectifier means including a charging resistor and a series resonant circuit across said charging resistor, and a series network including a series capacitor and a series resistor and adapted to be connected across the load when the load is inductive.

4. An electronic switch for operation between a voltage supply and a load, comprising a semiconductor controlled rectifier, firing means for turning on said rectifier, series circuit means including an auxiliary controlled rectifier means and a turn-off capacitor as well as a damping resistor, said series circuit means being connected across said semiconductor controlled rectifier for turning it off, and supply means for said rectifier means including a charging resistor and a series resonant circuit across said charging resistor, said supply means including a voltage source having a value corresponding to the voltage being switched.

5. An electronic switch for operation between a voltage supply and a load, comprising a semiconductor controlled rectifier, firing means for turning on said rectifier, series circuit means including an auxiliary controlled rectifier means and a turn-off capacitor as well as a damping resistor, said series circuit means being connected across said semiconductor controlled rectifier for turning it off, supply means for said rectifier means including a charging resistor and a series resonant circuit across said charging resistor, the time constant of said turn-off capacitor and damping resistor being equal to the time required to turn off said semiconductor controlled rectifier.

6. An electronic switch for operation between a voltage supply and a load, comprising a semiconductor controlled rectifier, firing means for turning on said rectifier, series circuit means including an auxiliary controlled rectifier means and a turn-off capacitor as well as a damping resistor, said series circuit means being connected across said semiconductor controlled rectifier for turning it off, supply means for said rectifier means including a charging resistor and a series resonant circuit across said charging resistor, said damping resistance having a value $(1/e)$ times the ohmic resistance of the load where $e$ is the base of natural logarithms.

7. An electronic switch for operation between a voltage supply and a load, comprising a semiconductor controlled rectifier, ignition means for turning on said rectifier, series circuit means including an auxiliary controlled rectifier means and a turn-off capacitor as well as a damping resistor, said series circuit means being connected across said semiconductor controlled rectifier for turning it off, supply means for said rectifier means including a charging resistor and a series resonant circuit across said charging resistor, the time constant of said turn-off capacitor and damping resistor being equal to the time required to turn off said semiconductor controller rectifier, said damping resistance having a value $(1/e)$ times the ohmic resistance of the load where $e$ is the base of natural logarithms.

8. An electronic switch for operation between a voltage supply and a load, comprising a semiconductor controlled rectifier, ignition means for igniting said rectifier, series circuit means including an auxiliary controlled rectifier means and an extinction capacitor as well as a damping resistor, said series circuit means being connevted across said semiconductor controlled rectifier for extinguishing it, supply means for said rectifier means including a charging resistor and a series resonant circuit across said charging resistor, said supply means including a voltage source having a value corresponding to the voltage being switched, the time constant of said extinction capacitor and damping resistor being equal to the time required to extingiush said semiconductor controlled rectifier, said damping resistance having a value $(1/e)$ times the ohmic resistance of the load where $e$ is the base of natural logarithms.

9. An electronic switch for operation between a voltage supply and a load, comprising a semiconductor controlled rectifier, firing means for turning on said rectifier, series circuit means including an auxiliary controlled rectifier means and a turn-off capacitor as well as a damping resistor, said series circuit means being connected across said semiconductor controlled rectifier for extinguishing it, supply means for said rectifier means including a charging resistor and a series resonant circuit across said charging resistor, said charging resistor having a value equal to the oscillatory resistance of the series resonant circuit.

10. An electronic switch for operation between a voltage supply and a load, comprising a semiconductor controlled rectifier, firing means for turning on said rectifier, series circuit means including an auxiliary controlled rectifier means and a turn-off capacitor as well as a damping resistor, said series circuit means being connected across said semiconductor controlled rectifier for turning it off, supply means for said rectifier means including a charging resistor and a series resonant circuit across said charging resistor, said supply means including a voltage source having a value corresponding to the voltage being switched, the time constant of said turn-off capacitor and damping resistor being equal to the time required to turn off said semiconductor controlled rectifier, said damping resistance having a value $(1/e)$ times the ohmic resistance of the load where $e$ is the base of natural logarithms, said charging resistor having a value equal to the oscillatory resistance of the series resonant circuit.

11. An electronic switch for operation betwen a voltage supply and a load, comprising a semiconductor controlled rectifier, ignition means for igniting said rectifier, series circuit means including an auxiliary controlled rectifier means and an extinction capacitor as well as a damping resistor, said series circuit means being connected across said semiconductor controlled rectifier for extinguishing it, supply means for said rectifier means including a charging resistor and a series resonant circuit across said charging resistor, said auxiliary rectifier means including variable firing means, said firing means and said ignition means forming together a pulse modulation system, said charging resistor and said damping resistor as well as said extinction capacitor having jointly a time constant equal to one-half the minimum pulse width produced by the switch.

12. An electronic switch for operation between a voltage supply and a load, comprising a semiconductor controlled rectifier, ignition means for igniting said rectifier, series circuit means including an auxiliary controlled rectifier means and an extinction capacitor as well as a damping resistor, said series circuit means being connected across said semiconductor controlled rectifier for extinguishing it, supply means for said rectifier means including a charging resistor in series with said rectifier means and a series resonant circuit across said charging resistor, said supply means including a voltage source having a value corresponding to the voltage being switched, the time constant of said extinction capacitor and damping resistor being equal to the time required to extinguish said semiconductor controlled rectifier, said damping resistance having a value $(1/e)$ times the ohmic resistance of the load where $e$ is the base of natural logarithms, said charging resistor having a value equal to the oscillatory resistance of the series resonant circuit, said auxiliary rectifier means including variable firing means, said firing means and said ignition means forming together a pulse modulation system, said charging resistor and said damping resistor as well as said extinction capactor having jointly a time constant equal to one-half the minimum pulse width produced by the switch.

13. An electronic switch for operation between a voltage supply and a load, comprising a semiconductor controlled rectifier, ignition means for turning on said rectifier, series circuit means including an auxiliary controlled rectifier means and a turn-off capacitor as well as damping resistor, said series circiut means being connected across said semiconductor controlled rectifier for turning it off, supply means for said rectifier means including a charging resistor in series with said rectifier means and a series resonant circuit across said charging resistor, said supply means including a voltage source having a value corresponding to the voltage being switched, the time constant of said turn-off capacitor and damping resistor being equal to the time required to turn off said semiconductor controlled rectifier, said damping resistance having a value $(1/e)$ times the ohmic resistance of the load where $e$ is the base of natural logarithms, said charging resistor having a value equal to the oscillary resistance of the series resonant circuit, said auxiliary rectifier means including variable firing means, said firing means and said ignition means forming together a pulse modulation system, said charging resistor and said damping resistor as well as said turn-off capacitor having jointly a time constant equal to one-half the minimum pulse width produced by the switch, a pair of diodes connected respectively across said rectifier and said rectifier means, a series network including a series capacitor and a series resistor and adapted to be connected across the load when the load is inductive.

References Cited by the Examiner

General Electric Controlled Rectifier Manual, 1st ed., 1960 (pages 71, 72 relied on).

ARTHUR GAUSS, *Primary Examiner.*